United States Patent [19]

Cooper, deceased et al.

[11] Patent Number: 4,564,656

[45] Date of Patent: Jan. 14, 1986

[54] PREPARATION OF GRAFT COPOLYMERS OF POLYPHENYLENE ETHER AND RUBBER, OPTIONALLY INCLUDING POLY(ALKENYL AROMATIC)

[75] Inventors: Glenn D. Cooper, deceased, late of Delmar, N.Y., by Rose H. Cooper, executrix; Philip L. Kinson, Breckville, Ohio

[73] Assignee: General Electric Company, Pittsfield, Mass.

[21] Appl. No.: 705,621

[22] Filed: Feb. 26, 1985

Related U.S. Application Data

[60] Division of Ser. No. 543,386, Oct. 19, 1983, abandoned, which is a continuation-in-part of Ser. No. 322,088, Nov. 17, 1981, abandoned, which is a continuation-in-part of Ser. No. 322,089, Nov. 17, 1981, abandoned, which is a continuation-in-part of Ser. No. 322,090, Nov. 17, 1981, abandoned.

[51] Int. Cl.[4] .............................................. C08F 8/00
[52] U.S. Cl. .................................... 525/152; 525/391; 525/392; 525/905
[58] Field of Search ................. 525/68, 391, 392, 152, 525/905

[56] References Cited

U.S. PATENT DOCUMENTS

| | | | |
|---|---|---|---|
| 3,402,144 | 9/1968 | Hay | 525/390 |
| 3,422,062 | 1/1969 | Segal et al. | 528/212 |
| 3,522,326 | 7/1970 | Bostick et al. | 525/391 |
| 4,118,348 | 10/1978 | Bennett et al. | 525/392 |
| 4,152,369 | 5/1979 | Bennett et al. | 525/534 |
| 4,158,028 | 6/1979 | Izawa et al. | 525/152 |
| 4,207,406 | 6/1980 | Olander | 525/391 |

*Primary Examiner*—Jacob Ziegler
*Attorney, Agent, or Firm*—Hedman, Gibson, Costigan & Hoare

[57] ABSTRACT

A process for the preparation of a graft product of polyphenylene ether and diene rubber from a starting mixture of the two polymers is described. The process can be extended by further polymerizing an alkenyl aromatic compound such as styrene in the presence of the graft product to form a novel terpolymer. The polymers which result from the process are useful as impact resistant modifiers for various engineering thermoplastics, including polyphenylene ether resins.

7 Claims, 2 Drawing Figures

PREPARATION OF GRAFT COPOLYMERS OF POLYPHENYLENE ETHER AND RUBBER, OPTIONALLY INCLUDING POLY(ALKENYL AROMATIC)

CROSS-REFERENCE TO RELATED APPLICATIONS

This is a division of application Ser. No. 543,386, filed Oct. 19, 1983, now abandoned, which in turn was a continuation-in-part of applications Ser. No. 322,088, Ser. No. 322,089 and Ser. No. 322,090, filed together on Nov. 17, 1981, all of which are abandoned.

BACKGROUND OF THE INVENTION

The polyphenylene ether resins, also frequently referred to as polyphenylene oxide resins, constitute a family of engineering thermoplastics known to be moldable or extrudable into a wide variety of articles ranging from parts or housings for household appliances or furnishings to essential components in various industrial applications. The polyphenylene ether resins and methods of their preparation are described in the patent literature, including U.S. Pat. Nos. 3,306,874 and 3,306,875 (Hay), and U.S. Pat. Nos. 3,257,357 and 3,257,358 (Stamatoff).

The polyphenylene ether (oxide) resins are admixable in widely variant proportions with styrene resins and other alkenyl aromatic polymers, including high impact (rubber modified) polystyrene resins, as is known from the disclosure in U.S. Pat. No. 3,383,435 (Cizek), and elsewhere in the literature.

The terms "high impact Polystyrene" and "rubber modified high impact polystyrene" have been employed in the art to refer to a family of polystyrene resins which are modified during manufacture to reduce the brittleness by incorporating a rubber during or after styrene polymerization. This group of materials are sometimes referred to simply as "HIPS". Various methods for their production are known. One process, which is described in British Pat. No. 1,002,901 (Westphal and Heinig), involves the polymerization of styrene monomer in the presence of a polybutadiene rubber or, alternatively, a polystyrene-polybutadiene (GR-S)rubber.

Recent advances in the art have shown that compositions of polyphenylene ether resin and styrene homopolymers or copolymers can be obtained by polymerizing a styrene monomer in the presence of a previously formed polyphenylene ether resin to form a graft copolymer of the two. Numerous procedures of this general type are described in the patent literature, including U.S. Pat. No. 3,664,977 (Nakanishi, et al.), U.S. Pat. No. 3,700,750 (Yamanouchi, et al.), U.S. Pat. No. 3,939,930 (Izawa, et al.), U.S. Pat. No. 4,189,417 (Goossens), and German patent publication No. 1,939,033 (Hamada, et al.). Typically, the reactions are carried out using the styrene as the solvent, and frequently in the presence of a catalyst such as a free radical initiator. The Nakanishi, et al. process includes a rubber as an integral component of the copolymerization reaction. Izawa, et al. and Yamanouchi, et al. also disclose embodiments in which the graft polymerization is conducted with a rubber present.

Allan Hay, in U.S. Pat. No. 3,402,144, proposes that polyphenylene ether resins can be modified by treatment with alkali metal alkyls or aryls to provide an activated polymer which will readily react with anionically polymerizable monomers to produce graft copolymers. Bostick, et al. in U.S. Pat. No. 3,522,326, describe graft copolymers of a 2-8 carbon alkylene and a polyphenylene ether prepared by this means, and they indicate that other monomers, including styrene, can also be grafted onto the polyphenylene ether using the same procedure.

Another recent development, disclosed in U.S. Pat. No. 4,152,369 (Bennett, et al.), comprises a process in which an alkenyl aromatic monomer, for example, styrene, is used as a solvent for the oxidative coupling of a phenol to form a polyphenylene ether resin and, thereafter, the alkenyl aromatic monomer is also polymerized to form what is described as a blend of the two polymers.

Olander in U.S. Pat. No. 4,207,406 describes the formation of polyphenylene oxide copolymers having alkenyl substituents in the structure and proposes that butadiene monomer, styrene monomer or polybutadiene can be interreacted to produce a graft copolymer.

SUMMARY OF THE INVENTION

In one of its aspects, the invention provides a process for preparing a graft product, or copolymer, of a polyphenylene ether resin and a diene rubber. More specifically, a polyphenylene ether resin and a diene rubber are reacted with one another in the presence of a free radical generating catalyst such that chemical bonds are formed between the two polymers.

Another aspect of the invention concerns the use of the graft copolymer prepared as above to produce a high impact poly(alkenyl aromatic)resin (or "HIPS"), by addition polymerizing an alkenyl aromatic monomer in the presence of the graft copolymer. The resulting product, which may be referred to as a terpolymer, exhibits better physical properties than some forms of HIPS which have been prepared in the conventional manner from styrene and rubber without polyphenylene ether present.

Still another aspect of the invention concerns thermoplastic compositions comprising blends of the above mentioned new forms of HIPS with various other polymers, for example, with polyphenylene ether resins.

DETAILED DESCRIPTION OF THE INVENTION

Figure 1:
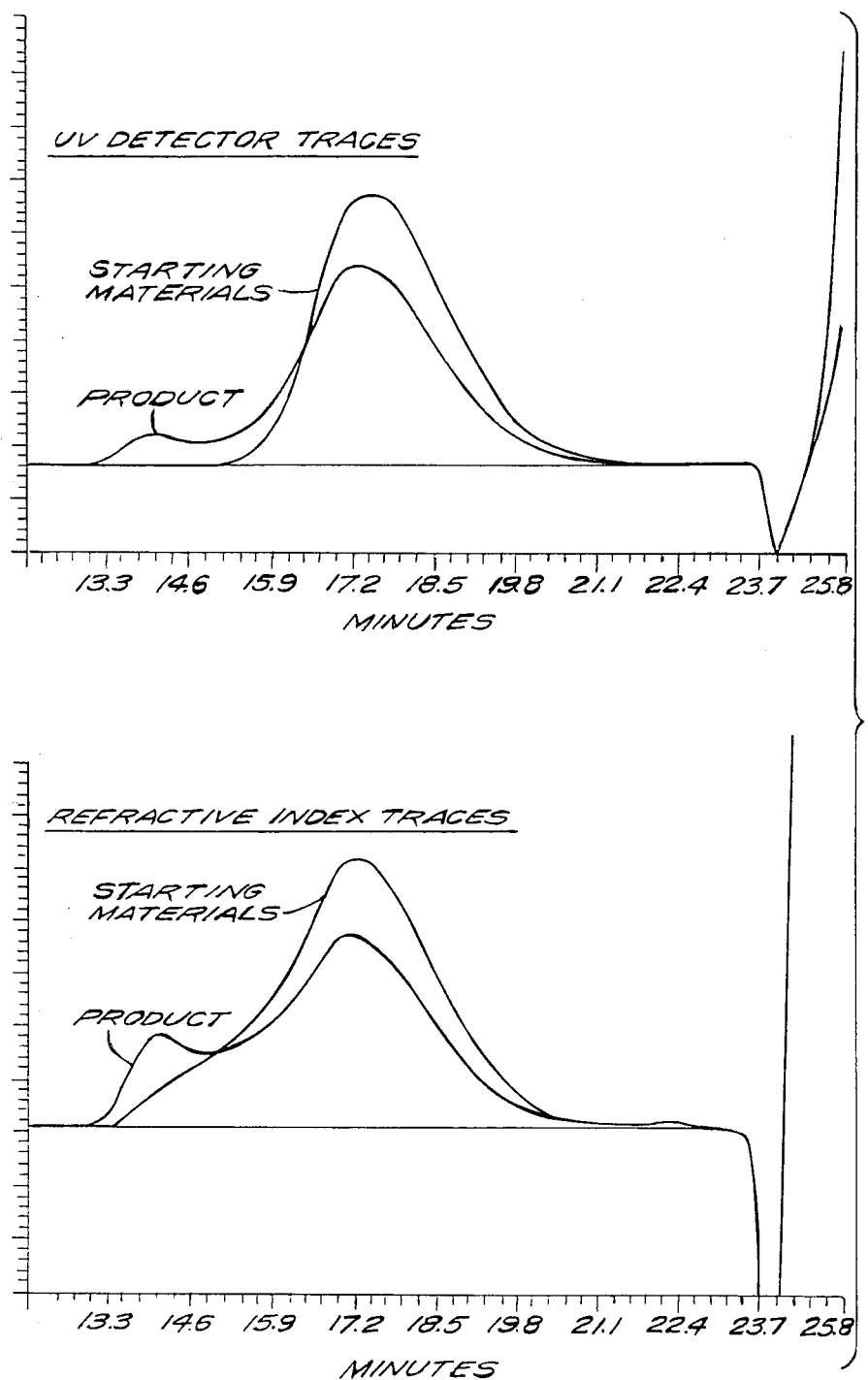

In greater detail, a polyphenylene ether resin and a polydiene rubber are dissolved in a mutual solvent, for example, xylene, benzene, toluene, chloroform or tetrahydrofuran. Preferably, the initial mixture will contain a sufficient amount of solvent to provide a content of the polymer solids of between about 5 and about 95% by weight. A free radical forming catalyst is also included in the mixture, preferably in an amount between about 0.01 and about 3 parts by weight for each 100 parts by the two polymers combined. The catalyst can be selected from among organic compounds known to generate free radicals in solution. Usually, these will be one or more organic peroxides or peroxy compounds. Prominent among them are benzoyl peroxide; dicumyl peroxide; lauroyl peroxide; octanoyl peroxide; 2,4-dichlorobenzoyl peroxide; 1,1-di(t-butylperoxy)-3,5,5-trimethyl cyclohexane; 1,1-di(t-butylperoxy) cyclohexane; and 2,5-dimethyl-2,5-bis(benzoyl peroxy) hexane. They may be used individually or in combination.

Only relatively small amounts of the free radical generating catalyst are needed to initiate grafting between the starting polymers, and normally between about 0.2 and about 0.4 parts by weight, per 100 parts of the two polymers, will be sufficient.

The reaction is most advantageously conducted at temperatures above room temperature (e.g., 23° C.), preferably in the range between about 50° and about 200° C. Free radicals are produced in solution and the formation of chemical bonds between the two polymers is initiated. In general, higher rates of reaction are achieved with use of higher amounts of the free radical forming catalyst and higher temperatures within the aforementioned ranges.

In general it is preferred that the polyphenylene ether resin and diene rubber are present in the initial reaction mixture in equivalent or nearly equivalent proportions, although this is not necessary for the successful practice of the invention.

The reaction may be conducted under normal conditions of atmospheric pressure, although superatmospheric pressures ranging from 1 to 50 atmospheres are possible, if desired. The reaction is also preferably carried out in the environment of an inert gas, such as nitrogen, argon or helium, to further facilitate production of the graft copolymer in high yield.

Formation of the graft copolymer is completed and the reaction is terminated after a period of about 10 minutes to about 24 hours, in a typical instance. Termination can be achieved in any of several ways. In one way, the reaction mixture is quickly cooled to a temperature unfavorable to further reaction. In another way, the reaction mixture is combined with an antisolvent for the graft copolymer, causing the precipitation of the latter; an example of a suitable antisolvent is methanol.

After the reaction has been completed, the graft copolymer may be separated from the mixture, if desired, as by filtration, evaporation of the solvent, or other conventional procedures.

The polyphenylene ether (oxide) resin which comprises one of the starting materials in the aforementioned procedure is preferably a homopolymer or copolymer having one or more units of the formula

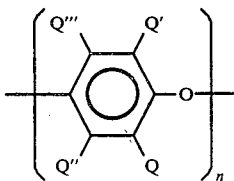

wherein Q, Q', Q" and Q''' are independently selected from the group consisting of hydrogen, halogen, hydrocarbon, halohydrocarbon, hydrocarbonoxy, and halohydrocarbonoxy; and n represents the total number of monomer units and is an integer of at least about 20, and more usually at least 50.

The polyphenylene ether resin can be prepared in accordance with known procedures, such as those described in the above mentioned patents of Hay and Stamatoff, from the reaction of phenols including but not limited to: 2,6-dimethylphenol; 2,6-diethylphenol; 2,6-dibutylphenol; 2,6-dilaurylphenol; 2,6-dipropylphenol; 2,6-diphenylphenol; 2-methyl-6-ethylphenol; 2-methyl-6-cyclohexylphenol; 2-methyl-6-tolylphenol; 2-methyl-6-methoxyphenol; 2-methyl-6-butylphenol; 2,6-dimethoxyphenol; 2,3,6-trimethylphenol; 2,3,5,6-tetramethylphenol; and 2,6-diethoxyphenol.

Each of these may be reacted individually to produce the corresponding homopolymer, or in admixtures to produce a corresponding copolymer, within the above formula. Special mention is made of 2,6-dimethylphenol and its corresponding polymer, poly(2,6-dimethyl-1,4-phenylene ether); and of 2,6-dimethylphenol used in conjunction with other phenols, such as 2,3,6-trimethylphenol, 2-methyl-6-butylphenol, and so forth, to produce the corresponding copolymer, such as poly(2,6-dimethyl-co-2,3,6-trimethyl-1,4-phenylene ether), poly(2,6-dimethyl-co-2-methyl-6-butyl-1,4-phenylene ether), and so forth.

Of particular interest for use in the present invention are polyphenylene ether homopolymers, as well as copolymers with alkenyl substituted phenols, and especially those of the formula in which Q is an alkenyl group having 2 to 4 carbon atoms and Q' is hydrogen or alkyl having 1 to 4 carbon atoms. Polymers of this type are described in U.S. Pat. No. 3,422,062 (Segal and Faurote), as well as in the above mentioned commonly assigned applications Ser. Nos. 322,088; 322,089; and 322,090, which are incorporated herein by reference. Specific mention is made of poly(2-methyl-6-propenyl-1,4-phenylene ether), poly(2-methyl-6-allyl-1,4-phenylene ether), poly(2-propenyl-1,4-phenylene ether) and poly(2-allyl-1,4-phenylene ether), as well as copolymers, such as poly(2,6-dimethyl-co-2-methyl-6-propenyl-1,4-phenylene ether), and poly(2,6-dimethyl-co-2-allyl-1,4-phenylene ether), poly(2,6-dimethyl-co-2-propenyl-1,4-phenylene ether), and poly(2,6-dimethyl-co-2-methyl-6-allyl-1,4-phenylene ether). Other examples appear in the above mentioned Segal and Faurote patent, and these are also utilizable here.

Polyphenylene ether homopolymers and copolymers having alkenyl substituents on the ring are more readily disposed toward the formation of grafting with the diene rubber and, therefore, are especially favored for this invention.

The resultant polyphenylene ether-diene rubber graft copolymer is commercially useful as such, or may be employed in a further aspect of the invention, which, as previously explained, involves the formation of a high impact alkenyl aromatic polymer, or HIPS.

In this process, the graft copolymer of polyphenylene ether and diene rubber prepared as described above is dissolved in an amount of alkenyl aromatic monomer and the monomer is thereafter polymerized. The polymerization can be carried out using bulk, suspension, emulsion or mass polymerization procedures.

As employed herein, the term "alkenyl aromatic" is intended in this disclosure to refer to compounds of the formula

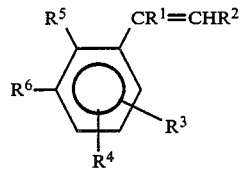

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms, or $R^5$ or $R^6$ may be concatenated together with hydrocarbyl groups to form a naphthyl group.

In addition to styrene, specific examples of the alkenyl aromatic compound are tert-butyl styrene, paramethyl styrene, 2,4-dimethyl styrene, chlorostyrene, dichlorostyrene, bromostyrene, dibromostyrene, p-tert-butylstyrene, p-ethylstyrene, vinyl xylene, divinylbenzene and vinyl naphthalene. Styrene is particularly preferred.

In one procedure, the alkenyl aromatic monomer is bulk polymerized in the presence of the graft copolymer by heating at a temperature in the range between about 50° and about 120° C., for a period of about 1 to about 24 hours, until a prepolymer is formed. To facilitate the reaction, the bulk procedure may be conducted in a reaction vessel under an inert atmosphere, such as nitrogen, and preferably also in the presence of free radical catalysts such as the peroxide or peroxy compounds described above or other free radical generating compounds. Thereafter, polymerization is continued by suspending the prepolymer in water and heating at 75° to 150° C. for 1 to 30 hours, or until polymerization of the alkenyl aromatic portion is completed or the desired degree of polymerization has been achieved. The suspension polymerization may be and preferably is conducted with use of a stabilizer for the dispersion, such as a polyvinyl alcohol.

In an alternate procedure, the alkenyl aromatic monomer may be mass polymerized by dissolving the polyphenylene ether-diene rubber graft copolymer in the monomer and heating the resultant mixture in a series of reaction zones of increasing temperatures.

The preferred final product will contain between about 60 and about 96% by weight of alkenyl aromatic polymer, and between about 4 and about 40% by weight of rubber-polyphenylene oxide.

The polyphenylene ether-diene rubber graft copolymer and the polyphenylene ether-diene rubber-poly(alkenyl aromatic) terpolymer produced in accordance with this invention can be used in blends with other polymers, including polyphenylene ether resins, polycarbonate resins, polyesters, polyamides, polyacrylates, poly(vinyl chlorides), and so forth, to upgrade the impact properties. The copolymer and terpolymer of this invention are advantageously employed in admixture with polyphenylene ether resins, such as those which have been described by Hay and Stamatoff, above, to obtain thermoplastic blends useful for the various purposes for which polyphenylene ether molding and extrusion compositions are known.

DESCRIPTION OF THE SPECIFIC EMBODIMENTS

The processes and products of the invention are illustrated in the following examples, which are not intended to be limiting.

EXAMPLE 1

This example illustrates the preparation of a polyphenylene ether-rubber graft copolymer by a process in accordance with the invention.

Twenty grams of polybutadiene rubber (Taktene 502, Polysar Limited Co.) and 20 grams of poly(2,6-dimethyl-E1,4-phenylene ether)resin PPO ®, General Electric Co.) were dissolved, with mixing, in 100 milliliters of toluene contained in a round bottom flask equipped with a mechanical stirrer and blanketed with gaseous nitrogen. A sample of the resulting solution was removed for examination by gel permeation chromatography (GPC). The remainder of the solution was heated to 100° C., 21 milligrams of 2,5-dimethyl-2,5-bis(benzoylperoxy)hexane were added, and the mixture was heated to 115° C., with continuous stirring, over a period of 8 hours. At the end of this period, 50 milliliters of xylene were added and heating was continued to distill off a portion of the toluene, raising the temperature to 135° C. An additional 50-milliter portion of xylene was then added, the solution was cooled to 125° C., and 280 milligrams of an 80% (by weight) solution of 1,1-di(t-butylperoxy)-cyclohexane in butylbenzylphthalate (Lupersol 331-80B, Lucidol Division of Pennwalt Corp.) were added. After 15 minutes at 125° C., the mixture had become quite viscous and the reaction mixture was then cooled to about room temperature.

The initial sample (containing the starting materials) and a sample of the final product mixture were analyzed by GPC in the standard manner, using a Waters Model 150-C chromatograph equipped with microstyragel columns (1 each of: $10^6$, $10^5$, $10^4$, $10^3$ and 500 A). The samples were dissolved beforehand in chloroform, and tetrahydrofuran was used as the eluting solvent.

FIG. 1 shows the GPC traces for both the initial sample (starting materials) and the sample of the final (graft copolymer) product mixture, as collected using a UV detector (top traces, detector set at 254 nanometers) and a refractive index detector (bottom traces). As can be seen, the starting materials exhibit relatively little absorption in the UV traces in the high molecular weight region (retention times of 13 to 16 minutes); this is due to the fact that the polybutadiene manifests essentially no UV absorption compared with poly(2,6-dimethyl-1,4-phenylene ether). The polybutadiene rubber in the high molecular weight region is instead visible in the refractive index trace. The product mixture, however, shows significant absorption in the high molecular weight region, which is indicative that a portion of the poly(2,6-dimethyl-1,4-phenylene ether) in the starting mixture has become chemically bound, that is, grafted to the polybutadiene rubber.

EXAMPLE 2

This example illustrates the use of an alkenyl substituted polyphenylene ether resin in the formation of a polyphenylene ether-polybutadiene graft copolymer in accordance with the invention.

Twenty grams of polybutadiene rubber (Taktene 502, Polysar Limited Co.) and 20 grams (1 mole %) poly(2,6-dimethyl-co-2-allyl-1,4-phenylene ether), the latter having been prepared via the oxidative coupling of 2-allylphenol and 2,6-xylenol, were dissolved in 100 milliliters of xylene, and the resultant solution was heated to 104° C. Two hundred and fifty grams of Lupersol 331-80B (see previous Example) were added, and the mixture was heated with stirring to 140° C. over a period of 45 minutes (the reaction mixture had by then become considerably more viscous), followed by cooling.

To evaluate different methods of polymer isolation, the mixture was divided into two portions. One portion was poured into an open pan, dried under vacuum at 47° C. using a nitrogen purge. The second portion was first diluted to 3% solids with toluene, then precipitation was induced by pouring into two volumes of methanol, and finally the precipitate was filtered and dried. Examination of the two products by means of GPC (both were completely soluble in chloroform) showed that they were of essentially the same molecular weight, which had not changed since the end of the reaction.

Figure 2:
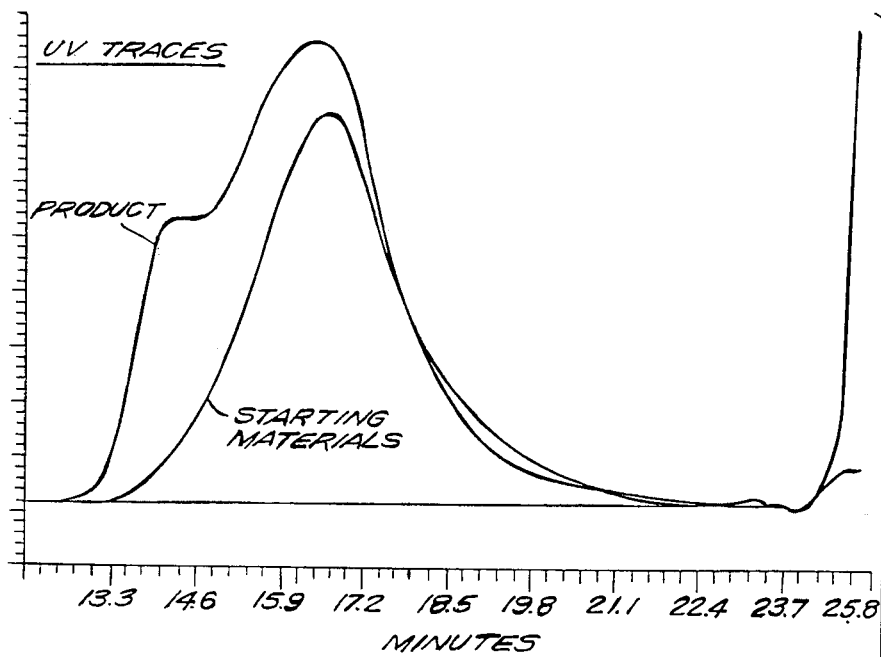
Figure 2:
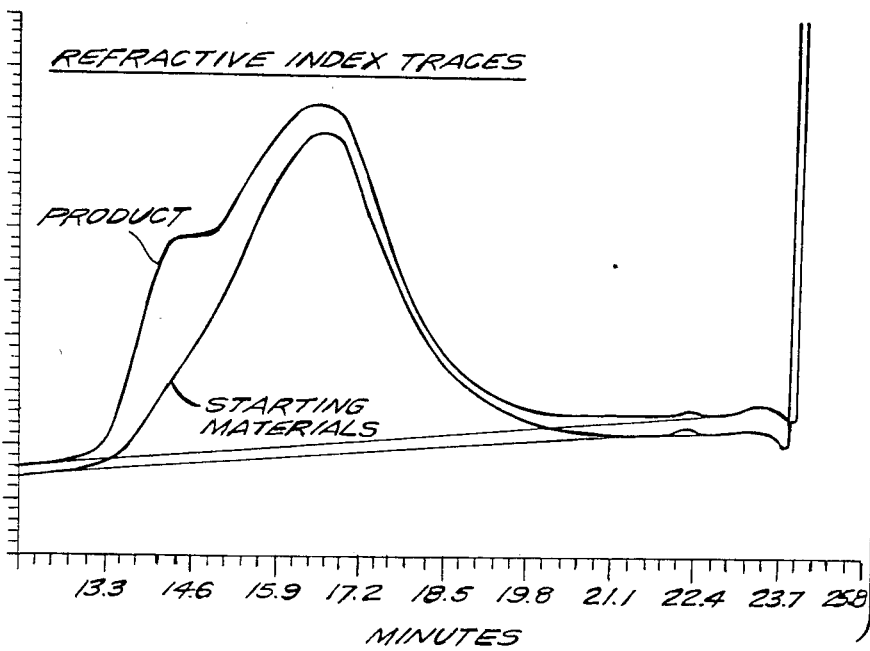

A review of the GPC traces of a sample of the starting materials and a sample of the final product mixture, respectively (FIG. 2) shows that a significant portion of the starting poly(2-allyl-co-2,6-dimethyl-1,4-phenylene ether) had become chemically bound (grafted) to the polybutadiene rubber. Moreover, the similarity in the shapes of the GPC product curves as seen using the UV and refractive index curves indicates that nearly all of the poly(2-allyl-co-2,6-dimethyl-1,4-phenylene ether) had become grafted to the rubber.

Further confirmation that grafting between the polyphenylene ether copolymer and the polybutadiene rubber has taken place is evidenced by the solubility behavior of the materials in dichloromethane. Polyphenylene ethers are known to form complexes with dichloromethane which under certain conditions precipitate from solution. In the present case, it was observed that over 95% of the product mixture precipitated from a 3% solution in methylene chloride, when left to stand overnight at about 10° C. In contrast, no material precipitated from a 3% solution of polybutadiene alone, in methylene chloride, under the same conditions. The fact that such a large percentage of the polybutadiene rubber precipitated together with the poly(2-allyl-co-2,6-dimethyl-1,4-phenylene ether) in the first solution indicated that a large portion of the rubber had been grafted.

EXAMPLE 3

This example illustrates the preparation of a graft copolymer like that of Example 1, except that the procedure was modified to provide larger amounts of product.

Seventy five grams of polybutadiene rubber (Taktene 502) and 75 grams of poly(2,6-dimethyl-1,4-phenylene ether) (PPO) were dissolved in 325 grams of xylene contained in one-liter capacity round bottom flask equipped with a mechanical stirrer and nitrogen blanket. The solution was brought to a temperature of 95° C. To this was added a solution of 0.6 gram of Lupersol 331-80B in 10 grams of xylene. The temperature was raised to 120° C. over a period of 45 minutes; the solution became noticeably thicker in consistency. The mixture was then poured into pans and the xylene was evaporated under vacuum, leaving a residue comprising a graft copolymer of poly(2,6-dimethyl-1,4-phenylene ether) and polybutadiene rubber.

To provide still more product, the reaction was repeated and the product of the second reaction was combined with the product of the first.

EXAMPLE 4

The example illustrates the preparation of a high impact polystyrene in accordance with the invention.

Two hundred grams of a graft copolymer prepared as described in Example 3 were dissolved in 800 grams of styrene. The solution was transferred to a one-gallon reactor, to which were also added 0.5 gram of azo-bis-isobutyronitrile and 0.5 gram of dicumyl peroxide. The solution was purged with nitrogen and the reactor was sealed and heated for 5 hours at 82° C., to give a prepolymer (partially polymerized polymer). The prepolymer was suspended in a solution comprising 6 grams of poly-(vinyl alcohol) and 4.5 grams of gelatin dissolved in 2000 milliliters of water. The suspension was heated for 1 hour at 100° C., followed by heating for 15 hours at 135° C., to yield a poly(2,6-dimethyl-1,4-phenylene ether)-polybutadiene rubber-polystyrene terpolymer.

For purposes of comparison, the procedure was repeated, using 100 grams of polybutadiene rubber alone (no polyphenylene oxide) in 900 grams of styrene.

Both polymers were extruded into molding pellets using a single screw extruder and then molded into test bars using a one-ounce injection molding machine. The respective properties are reported below. A commercial HIPS, Foster Grant's FG 834, containing 9% polybutadiene and the balance polystyrene, is also included for comparison.

TABLE

| HIPS | Tensile Elong., % | Tensile yield, psi. | Notched Izod im-str., ft. lbs./in. | Heat distort. temp., °F. |
|---|---|---|---|---|
| Taktene-PPO graft/polystyrene (This invention) | 82 | 5700 | 3.4 | 200 |
| Taktene/polystyrene (Comparison No. 1) | 32 | 6400 | 2.3 | 193 |
| FG 834 (Comparison No. 2) | 118 | 330 | 3.0 | 174 |

As can be seen, the HIPS in accordance with the invention possesses better ductility (as measured by Tensile Elongation), impact strength, and heat distortion temperature than the first comparison material, prepared from the same styrene and the same rubber but without PPO. The impact strength and heat distortion temperature are also better than those of the second comparison material (FG 834). Notably, all three forms of HIPS contain virtually the same amount of rubber. The polymer according to the invention and the comparison No. 1 polymer both had 10%; the comparison No. 2 had 9%. Thus, the differences in properties are not attributable to rubber content.

Use of a mutual solvent for the starting polymers in the preparation of a graft copolymer of polyphenylene ether and rubber (for instance, Examples 2 and 3) is essential, as was concluded from the comparison experiment described below.

Twenty grams of polybutadiene rubber (Taktene 1202) and 20 grams of poly(2,6-dimethyl-1,4-phenylene ether) resin (PPO) were pre-mixed and added to a Brabender where the two polymers were mixed and heated at 260°–300° C. for 10 minutes, then removed and cooled. When an attempt was made to dissolve the resulting product in toluene and, separately, in chloroform, it was found that a large portion was not soluble, which was indicative that very little if any grafting had taken place. In contrast, the products of Examples 1, 2 and 3, above, were completely soluble in both of these solvents. Moreover, if peroxide or some other free radical forming agent were added to the Brabender mix, the expectation is that the rubber alone would crosslink, rendering the mixture unsuitable. In the procedure described for the invention, on the other hand, the free radical source facilitates graft formation.

Other modifications and variations of the invention in its various facets are possible in the light of the above disclosure. For instance, while the invention has been illustrated with use of poly(2,6-dimethyl-1,4-phenylene ether) resin, copolymers such as poly(2,6-dimethyl-co-2,3,6-trimethyl-1,4-phenylene ether) may be used instead. Besides poly(2,6-dimethyl-co-2-allyl-1,4-phenylene ether), other alkenyl substituted copolymers such as poly(2,6-dimethyl-co-2-methyl-6-propenyl-1,4-phenylene ether) or poly(2,6-dimethyl-co-2-propenyl-1,4-phenylene ether) are employable. Other forms of diene rubber, such as Isoprene rubber, styrene-butadiene copolymers (GR-S rubber), butadiene-acrylonitrile copolymers, and so forth, are possible. Instead of styrene monomer, the process can be carried out using t-butylstyrene, para-methylstyrene, bromostyrene, dibromostyrene, etc. The graft copolymers and alkenyl aromatic containing terpolymers may be formed into blends with poly(2,6-dimethyl-1,4-phenylene ether)resin or the other thermoplastic polymers described above to provide various impact modified molding formations.

It should be obvious, therefore, that changes may be made in the embodiments exemplified which are still within the scope of the invention defined in the appended claims.

We claim:

1. A process for preparing an impact resistant thermoplastic polymer, comprising the steps of:
    (a) providing a mixture of (1) a polyphenylene ether resin and (2) a diene rubber, in a mutual solvent;
    (b) heating the mixture in the presence of a source of catalytic free radicals at a temperature and for a period of time sufficient to achieve chemical bonding between at least a portion of the (1) and a portion of the (2), whereby a graft copolymer of the two is formed;
    (c) forming a second mixture, comprising the graft copolymer from step (b) and an alkenyl aromatic monomer; and
    (d) polymerizing the alkenyl aromatic monomer in the second mixture, whereby a terpolymer of the polyphenylene ether, diene rubber and poly(alkenyl aromatic) is formed.

2. A process according to claim 1, in which the alkenyl aromatic monomer is used as the reaction solvent in steps (c) and (d).

3. A process according to claim 1 in which step (d) is conducted in two stages, comprising a bulk polymerization first stage using a temperature in the range between about 50° and about 120° C. to form a prepolymer, and a suspension polymerization second stage using a temperature in the range between about 75° C. and about 150° C. to form the final terpolymer.

4. A process according to claim 1, in which step (d) is carried out by mass polymerization using multiple heating zones.

5. A process according to claim 1, in which the alkenyl aromatic monomer has the formula

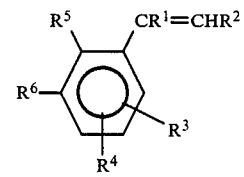

wherein $R^1$ and $R^2$ are selected from the group consisting of lower alkyl, alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen, lower alkyl and alkenyl groups of from 1 to 6 carbon atoms to form a naphthyl group.

6. A process according to claim 5, in which the alkenyl aromatic monomer is styrene.

7. The impact resistant thermoplastic polymer prepared by the process of claim 1.

* * * * *